May 9, 1961 R. L. WHITE 2,983,120
ROLLER SPLINE
Filed Nov. 2, 1959
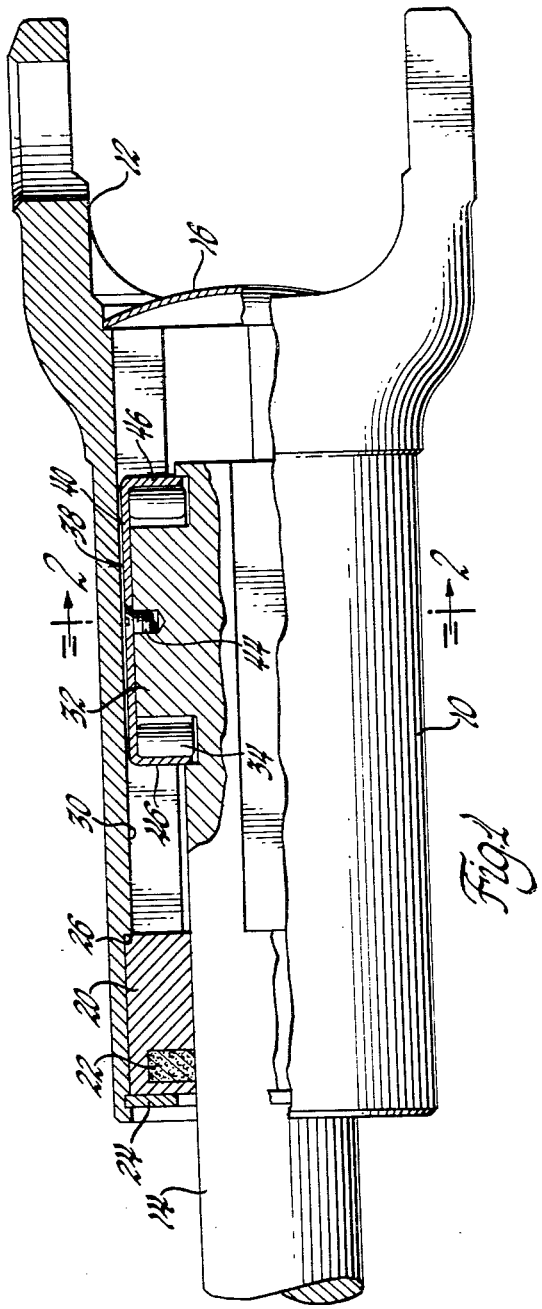
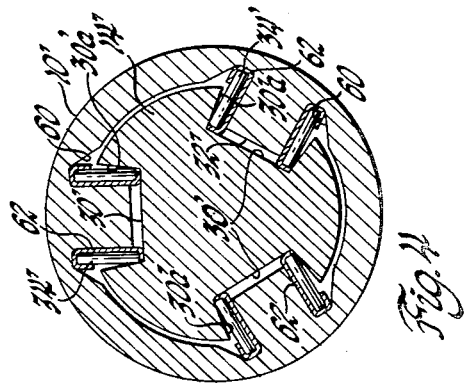
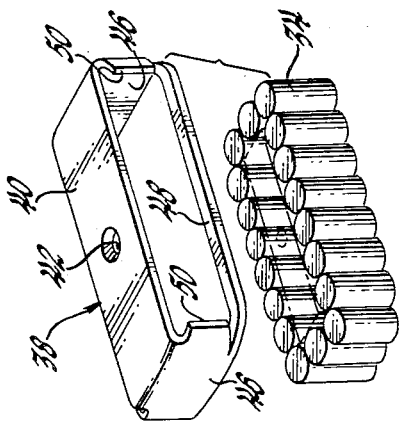
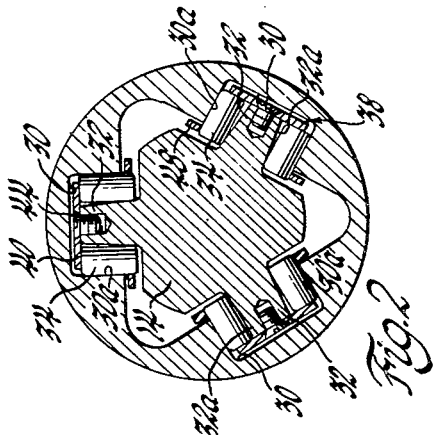
INVENTOR.
Robert L. White
BY
Bryce Beecher
ATTORNEY 2,983,120
Patented May 9, 1961

2,983,120

ROLLER SPLINE

Robert L. White, Saginaw, Mich., assignor to General Motors Corporation, Detroit, Mich., a corporation of Delaware Filed Nov. 2, 1959, Ser. No. 850,452

10 Claims. (Cl. 64—23)

This application is a continuation-in-part of my application Serial No. 732,033, filed April 30, 1958.

The present invention relates to a slip joint and more particularly pertains to a joint of this category incorporating anti-friction elements between the telescopically related parts.

Independent rear suspensions are coming into more general use in the automotive industry. Such a suspension, as well understood, requires a slip joint in the universally-jointed axles through which the rear wheels are driven. While slip joints were developed for use in the earlier independent rear suspension installations incorporating metal springs, these prior joints are not generally suited for employment with the high torque engines of present-day vehicles.

Accordingly, it is a principal object of the invention to provide a slip joint for the purpose indicated which is capable of taking high torque loads quickly applied thereto.

Another object is to provide a slip joint which will work freely when under a high torque load.

Still other objects and features of the invention will be apparent from the following specific description of a preferred embodiment thereof illustrated by the accompanying drawings wherein:

Figure 1 is a view partly in section and partly in elevation, with certain parts shown broken away;

Figure 2 is a section on the line 2—2 in Figure 1;

Figure 3 affords a perspective view of a train of anti-friction elements of the type preferably employed in the joint and a retainer member for such elements; and Figure 4 is a view similar to Figure 2 showing a modification.

In the drawings, the numeral 10 denotes a tubular axle member formed as a yoke 12 at its right-hand end, the yoke being part of a universal joint connection. Disposed telescopically within the axle member 10 is a shaft 14. In use of the joint, the axle member 10 extends in the direction of the vehicle differential, the shaft 14 toward one of the driving wheels.

A Welch plug 16 closes the right-hand end of the axle member 10. At the other end of such member there is provided a bushing 20 recessed to accommodate a wiper seal 22 for the shaft 14. A snap ring 24 secures the bushing 20 within the axle member 10, the bushing bearing through its face opposite the snap ring against a shoulder 26 formed by reducing the section of the wall of the axle member in the indicated area.

Axle member 10 is formed internally to provide a plurality of recesses 30 accommodating lugs 32. These lugs extend radially of the body of the shaft 14 and have side walls 32a tapering in the direction such that the width of the lug is less the greater the distance from its root. Also accommodated in each recess 30 is a train of rollers 34 surrounding the lug.

To retain and guide the roller trains, there is supplied in each recess 30 a retainer member 38. This member includes a web portion 40 overlying the lug and provided with an aperture 42 in which the head of a fastening screw 44 seats. Shown integral with the web portion 40 are end wall portions 46 which are interconnected by rails 48 as well as by web portion 40. Each end wall 46 carries a pair of deflector fingers 50, facilitating and rendering smooth the transfer between the two straight courses. These fingers are curved to conform with the curved portions of the rails 48 and are disposed in radial alignment wtih such portions, which act to feed the rollers to the fingers and vice versa.

With the arrangement as shown and described, it should be apparent that torque imposed at the axle member 10 is translated to the shaft 14 through the roller trains and that relative axial movement of the shaft and axle member may occur under the torque load.

It is important to point out that a clearance is provided between the walls 32a of the lugs and the walls 30a of the recesses 30 slightly exceeding the diameter of the rollers. Thus, referring to Figure 2, if the member 10 is rotated counter-clockwise, for example, only the right hand line of rollers will be under load, the rollers in the other line being free to travel without load interference. This condition, of course, reverses on clockwise rotation of the axle member 10.

Because of the design clearance above mentioned, when torque is first applied the axle member 10 rotates relative to the shaft 14 causing the side walls 30a of the recesses 30 to assume a slight angle relative to the center line of the lugs 32. Except for the previously-mentioned tapering of the walls 32a of the lugs, this condition would cause the working rollers to unduly load the adjacent lug walls near the outer edges thereof resulting in excessive wear at such points. Thus, in a bench test using apparatus causing slippage of the joint parts under torque load, the torque load being calculated in relation to the contemplated use of the joint, the tapering increased the life of the joint from approximately 500,000 cycles to approximately 1,500,000 cycles.

Figure 4 illustrates an assembly conforming to the invention in which the driving component 10' rather than the driven shaft 14' incorporates the keys or lugs 32'. Thus, the shaft 14' is recessed for the accommodation of the lugs and the anti-friction bearings 34' which, as will be immediately recognized, are of lesser diameter than the bearings 34. As in the case of the embodiment of Figures 1–3, the clearance between the side walls of of the lugs and the side walls of the recess exceeds the diameter of the bearing elements to the end that the latter are not under load as they travel one of the straight courses. To avoid the excessive wear previously referred to, the side walls 30a' of the recesses 30' are so tapered that the recess is wider at the top than at the bottom. It will be observed that each lug has at either side thereof a recess 60 for the reception of the outer ends of the bearing elements and the corresponding portions of a retainer member 62 which encases all but the working areas of the elements and provides for their recirculation.

I claim:

1. A slip joint comprising a pair of telescopically related members one of which carries an elongated radially extending lug, the other of which has therein a recess in which said lug is accommodated along with an endless train of cylindrical anti-friction elements surrounding said lug, said elements in operation of the joint following a path including opposed courses at the sides of said lug and opposed courses at the ends of the lug which interconnect said first courses, the clearance between the side walls of said lug and the side walls of said recess exceeding the diameter of said cylindrical anti-friction elements, the side walls of said lug and said recess being tapered to reduce localized wearing by said elements.

2. A slip joint comprising a pair of telescopically related members the outer of which is adapted to drive the inner rotatably, said outer member having a recess in the internal wall thereof adapted to accommodate an elongated lug carried by said inner member and to additionally accommodate an endless train of cylindrical anti-friction elements surrounding said lug, said elements in operation of the joint following a path including opposed courses at the sides of said lug and opposed courses at the ends of the lug which interconnect said first courses, the clearance between the side walls of said lug and the side walls of said recess exceeding the diameter of said cylindrical anti-friction elements, the side walls of said lug being tapered in the direction such that the width of the lug is less the greater the distance from its root.

3. A slip joint comprising a pair of telescopically related members the outer of which is adapted to drive the inner rotatably, said outer member having an elongated lug projecting radially inwardly from the internal wall thereof, said inner member having therein a recess adapted to accommodate said lug together with an endless train of cylindrical anti-friction elements surrounding said lug, said elements in operation of the joint following a path including opposed courses at the sides of said lug and opposed courses at the ends of the lug which interconnect said first courses, the clearance between the side walls of said lug and the side walls of said recess exceeding the diameter of said cylindrical anti-friction elements, the side walls of said recess being tapered in the direction such that said recess is wider at the top than at the bottom.

4. A slip joint comprising a pair of telescopically related members one of which carries an elongated radially extending lug, the other of which has therein a complementary recess in which said lug is accommodated together with an endless train of cylindrical anti-friction elements surrounding said lug, said elements in operation of the joint following a path including opposed straight courses at the sides of said lug, and a retainer member in said recess and fastened to said lug, said retainer having end walls serving as guides in the transfer of said elements between said straight courses and further having a pair of opposed side rails interconnected through said end walls and spaced outward of the sides of said lug.

5. A slip joint according to claim 4 where there exists a clearance between the side walls of said lug and the side walls of said recess exceeding the diameter of said anti-friction elements and where the side walls of one of said lug and said recess are tapered to reduce localized wearing by said elements.

6. A slip joint comprising a pair of telescopically related members one of which carries an elongated radially extending lug, the other of which has therein a complementary recess in which said lug is accommodated together with an endless train of cylindrical anti-friction elements surrounding said lug, said elements in operation of the joint following a generally rectangular path including opposed straight courses at the sides of said lug, and a box-like retainer in said recess and fastened to said lug, said retainer having end walls interconnected through a pair of opposed side rails including curved end portions and spaced outward of the sides of said lug a distance set by the diameter of said elements with respect to which said rails serve as guides, said walls each having a pair of deflector fingers extending as curved wings therefrom in radial alignment with the curved portions of said rails.

7. A slip joint comprising a pair of telescopically related members one of which carries an elongated radially extending lug, the other of which has therein a complementary recess in which said lug is accommodated together with an endless train of cylindrical anti-friction elements surrounding said lug, said elements in operation of the joint following a generally rectangular path including opposed straight courses at the sides of said lug, and a box-like retainer in said recess and fastened to said lug, said retainer having end walls interconnected through a web portion overlying said lug and serving as guides in the transfer of said elements between said straight courses, and further having a pair of opposed side rails spaced radially of said web portion and connected to said end walls.

8. A slip joint according to claim 7 where said retainer is fastened to said lug through said web portion.

9. A slip joint comprising a pair of telescopically related members one of which carries an elongated radially extending lug, the other of which has therein a complementary recess in which said lug is accommodated together with an endless train of rollers surrounding said lug, said rollers being disposed with their axes paralleling the walls of the lug and in operation of the joint following a generally rectangular path including opposed straight courses at the sides of the lug, and a box-like retainer in said recess and fastened to said lug, said retainer having a web portion overlying said lug through which the retainer is fastened to the lug and end walls interconnected through said web portion and through a pair of opposed side rails spaced radially of said web portion, said end walls serving as guides in the transfer of said rollers between said straight courses, said rails having curved end portions and acting as guides for said rollers with relation to said end walls, each of said end walls carrying a pair of deflector fingers extending therefrom as curved wings in radial alignment with the curved portions of said rails.

10. A slip joint comprising a pair of telescopically related members the inner of which carries an elongated radially extending lug, the outer of which has therein a complementary recess in which said lug is accommodated together with an endless train of rollers surrounding said lug, said rollers being disposed with their axes paralleling the walls of the lug and in operation of the joint following a generally rectangular path including opposed straight courses at the sides of the lug, and a box-like retainer in said recess having a web portion overlying said lug through which the retainer is fastened to the lug and end wall portions interconnected through said web portion and through a pair of opposed side rails spaced radially inward of said web portion, said end walls serving as guides in the transfer of said rollers between said straight courses, said rails having curved end portions and acting as guides for said rollers and with relation to said end walls, each of said end walls carrying a pair of deflector fingers extending therefrom as curved wings in radial alignment with the curved portions of said rails.

References Cited in the file of this patent
UNITED STATES PATENTS

| | | |
|---|---|---|
| 1,918,108 | Jonkhoff | July 11, 1933 |
| 2,791,894 | Duckworth | May 14, 1957 |